(12) United States Patent
Horinouchi

(10) Patent No.: US 7,898,928 B2
(45) Date of Patent: Mar. 1, 2011

(54) OBJECTIVE LENS AND OPTICAL PICKUP DEVICE

(75) Inventor: Shogo Horinouchi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 11/963,933

(22) Filed: Dec. 24, 2007

(65) Prior Publication Data

US 2008/0181086 A1    Jul. 31, 2008

(30) Foreign Application Priority Data

Dec. 28, 2006    (JP) .............................. 2006-354287

(51) Int. Cl.
*G11B 7/12*    (2006.01)

(52) U.S. Cl. ........................ 369/112.23; 369/112.03; 369/112.11

(58) Field of Classification Search ............ 369/112.01, 369/112.03, 112.05, 112.06, 112.11, 112.13, 369/112.23, 112.24, 112.25, 112.26, 112.08
See application file for complete search history.

(56) References Cited

U.S. PATENT DOCUMENTS

| | | | |
|---|---|---|---|
| 6,363,037 B1* | 3/2002 | Yamazaki | 369/112.26 |
| 6,449,095 B1* | 9/2002 | Ohtaki et al. | 359/566 |
| 2002/0012313 A1* | 1/2002 | Kimura et al. | 369/112.08 |
| 2003/0095492 A1* | 5/2003 | Nishino et al. | 369/112.08 |
| 2003/0227858 A1* | 12/2003 | Komma | 369/112.08 |
| 2004/0160885 A1* | 8/2004 | Kimura | 369/112.09 |
| 2005/0047312 A1* | 3/2005 | Yamanaka et al. | 369/112.03 |
| 2006/0109773 A1* | 5/2006 | Katsuma et al. | 369/112.23 |
| 2007/0127348 A1* | 6/2007 | Ooi et al. | 369/112.02 |

FOREIGN PATENT DOCUMENTS

JP    2001-160223    6/2001

* cited by examiner

*Primary Examiner*—Wayne R Young
*Assistant Examiner*—Thomas D Alunkal
(74) *Attorney, Agent, or Firm*—Dickinson Wright PLLC

(57) ABSTRACT

To provide an objective lens and an optical pickup device which can thin the objective lens and a device on which the objective lens is mounted, and which can prevent that the pitch of the diffraction grating at the outer periphery of the objective lens becomes too small in the manufacturing procedure and so it becomes difficult to manufacture the Fresnel lens or which does not require a high-grade fine processing technique in order to minimize the pitch of the diffraction grating, in an objective lens which condenses a laser light emitted from a light source to irradiate on an optical disk, the outer periphery on the side surface of the objective lens in which the laser light is incident is formed by a refractive lens portion 7*a* and the inner periphery thereof is formed by a Fresnel lens portion 7*b*.

13 Claims, 11 Drawing Sheets

OBJECTIVE LENS AND OPTICAL PICKUP DEVICE

BACKGROUND

1. Field of the Invention

The present invention relates to an objective lens and an optical pickup device which perform at least one of the reading and reproduction of information from and into an optical disk or an optical card.

2. Description of the Related Art

FIGS. 8 and 9 are diagrams each showing the optical configuration of an optical pickup device of a related art, in which FIG. 9 is a diagram seen from the side surface of the optical configuration of FIG. 8.

In FIGS. 8 and 9, a laser light ray 102a emitted from a semiconductor laser 101 is reflected by a flat plate beam splitter 103, then incident into a collimator lens 104 as a light ray 102b and formed into a parallel light ray 102c after passing through the collimator lens. A part 102d of the laser light 102a passes through the flat plate beam splitter 103 and is received by a laser emission light monitor sensor 105. The flat plate beam splitter 103 separates an incident light into a reflection light reflected thereby and a transmission light passing therethrough and is mostly designed so as to set a ratio between the refection light amount and the transmission light amount to 8:2, for example. The parallel light ray 102c is reflected by a rectangular mirror 106 and incident into an objective lens 107 as a parallel light ray 102e. The parallel light ray 102e is formed into a converged light ray 102f by the objective lens 107 and irradiated on an optical disk 108 as a spot 102g. Information is recorded on and reproduced from the optical disk 108 by means of the spot 102g.

A reflection light ray of the spot 102g reflected by the optical disk 108 propagates in a direction opposite to that of the aforesaid optical path in a manner of 102f→102e→102c→102b. Supposing that the flat plate beam splitter 103 is designed so as to have a ratio between the refection light amount and the transmission light amount to 8:2 as described above, for example, 20% of the entire reflection light ray from the optical disk 108 passes through the flat plate beam splitter 103 (a light ray 102h of FIGS. 8 and 9) and is incident into a cylindrical lens 109. The cylindrical lens 109 is a lens which acts as a concave lens as to a light ray propagating along the drawing sheet of FIG. 8 but does not act as a lens as to a light ray propagating along the drawing sheet of FIG. 9. Thus, the light ray 102h is converted into a light ray 102i having astigmatism. By using the light ray 102i having the astigmatism and a light receiving sensor 110, a focus error signal, a tracking error signal and an RF signal can be obtained as well known as the astigmatism method in the field of the optical head for an optical disk. Since the theory for generating the focus error signal, tracking error signal, RF signal etc. according to the astigmatism method is disclosed in (Patent Document 1), the detailed explanation thereof will be omitted here.

Patent Document 1: JP-A-2001-160223

In an optical disk driving apparatus which is one of the application fields to which the invention is applied, the optical disk driving apparatuses are classified into a half height driving apparatus with a thickness of 42 mm, a slim driving apparatus with a thickness of 12.7 mm and a ultra slim driving apparatus with a thickness of 9.5 mm when classified in view of the thickness of the optical disk driving apparatus. Further, the optical disk driving apparatuses are classified into a CD type, a DVD type and a BD (compliant with a blue ray disk) type in view of the functions of the optical disk driving apparatus.

The invention makes it be possible to easily thin the apparatus in the slim driving apparatus and the ultra slim driving apparatus. In order to thin the apparatus, it is necessary to thin the reflection mirror 106 and the objective lens 107. However, in the BD driving apparatus (the driving apparatus compliant with a blue ray disk) expected to be spread in the future, since the standard thereof defines to use an objective lens with a numerical aperture of 0.85, the thickness of the center of the objective lens also becomes necessarily larger than that of the CD type and the DVD type, so that there arises a large problem that it is very difficult to thin the apparatus. For example, when the lens thickens is compared as to commercial lenses having the same focal distance of 2 mm, the thickness for each of the CD type and the DVD type is 1.147 mm but the thickness for the BD type is 3.262 mm which is almost three times as large as that of each of the CD type and the DVD type. Thus, in the optical disk apparatus compliant with a blue ray disk, there is a problem that the entire thickness of the optical disk apparatus must be large by an amount corresponding to the larger thickness of the objective lens.

FIGS. 10 and 11 are diagrams each showing an example of the configuration of an optical pickup device of a related art proposed in order to solve the aforesaid problem. FIGS. 10 and 11 are diagrams each showing the optical configuration of the optical pickup device of the related art, in which FIG. 11 is a diagram seen from the side surface of the optical configuration of FIG. 10. The optical pickup device of the related arts shown in FIGS. 10 and 11 is arranged in a manner that the objective lens 107 used in FIGS. 8 and 9 are replaced by a flat plate Fresnel lens 111 in order to thin the apparatus.

FIG. 13 is a diagram showing the relation between the numerical aperture and the pitch of the diffraction grating of the Fresnel lens, in which the abscissa represents the numerical aperture (NA) and the ordinate represents the pitch of the diffraction grating. Further, in this figure, the pitches of the diffraction grating of the Fresnel lens are calculated under the condition that the numerical aperture is 0.85 and the wavelength of a light ray is 405 nm in FIGS. 10 and 11. Furthermore, although, in FIG. 13, the refractive lens is replaced by the Fresnel lens in order to simplify the calculation, the calculation results are almost same as the case of the refractive lens which is used actually.

As clear from FIG. 13, the pitch becomes abruptly small at the outer periphery of the lens (an area having a large numerical aperture (NA)) as compared with the center portion of the lens (an area having a small numerical aperture (NA)) and becomes about several microns at almost numerical aperture (NA) of 0.85. Thus, although an enlarged diagram of the flat plate Fresnel lens in the optical pickup device of the related art is shown in FIG. 12, this Fresnel lens 111 has a problem that the manufacturing thereof is difficult or a high-grade fine processing technique is required in order to minimize the pitch of the diffraction grating. According to the current technique, it is almost impossible to manufacture the aforesaid Fresnel lens 111.

SUMMARY

The invention was made in order to solve the aforesaid problems and an object of the invention is to provide an objective lens and an optical pickup device which can thin the objective lens and a device on which the objective lens is mounted, and which can prevent that the pitch of the diffraction grating at the outer periphery of the objective lens becomes too small in the manufacturing procedure and so it becomes difficult to manufacture the Fresnel lens or which does not require a high-grade fine processing technique in order to minimize the pitch of the diffraction grating.

The invention was made in order to solve the aforesaid problems and relates to an objective lens which condenses a laser light emitted from a light source to irradiate on an optical disk, wherein the outer periphery on the side surface of the objective lens in which the laser light is incident is formed by a refractive lens and the inner periphery thereof is formed by a Fresnel lens According to the aforesaid configuration of the invention, since the outer periphery of the side surface of the objective lens in which the laser light is incident is formed by the refractive lens and the inner periphery thereof is formed by the Fresnel lens, the following two contradictory problems are solved. That is, the first problem is that when both the outer periphery and the inner periphery of the objective lens are entirely formed as the Fresnel lens in order to reduce the maximum size of the objective lens in the optical axis direction, the pitch of the diffraction grating at the outer periphery of the objective lens becomes too small and so it is difficult to manufacture the Fresnel lens or a high-grade fine processing technique is required in order to minimize the pitch of the diffraction grating. The second problem is that when the objective lens is not formed by the Fresnel lens at all, the maximum size of the objective lens in the optical axis direction can not be made small. Thus, according to the embodiment, the objective lens can be made thin to the maximum extent in a manufacturable range. As a result, since the maximum size of the objective lens in the optical axis direction can be made small to the maximum extent in a manufacturable range, the entire size of the apparatus mounting the objective lens can be made thin easily.

DETAILED DESCRIPTION

First Embodiment

Figure 1:
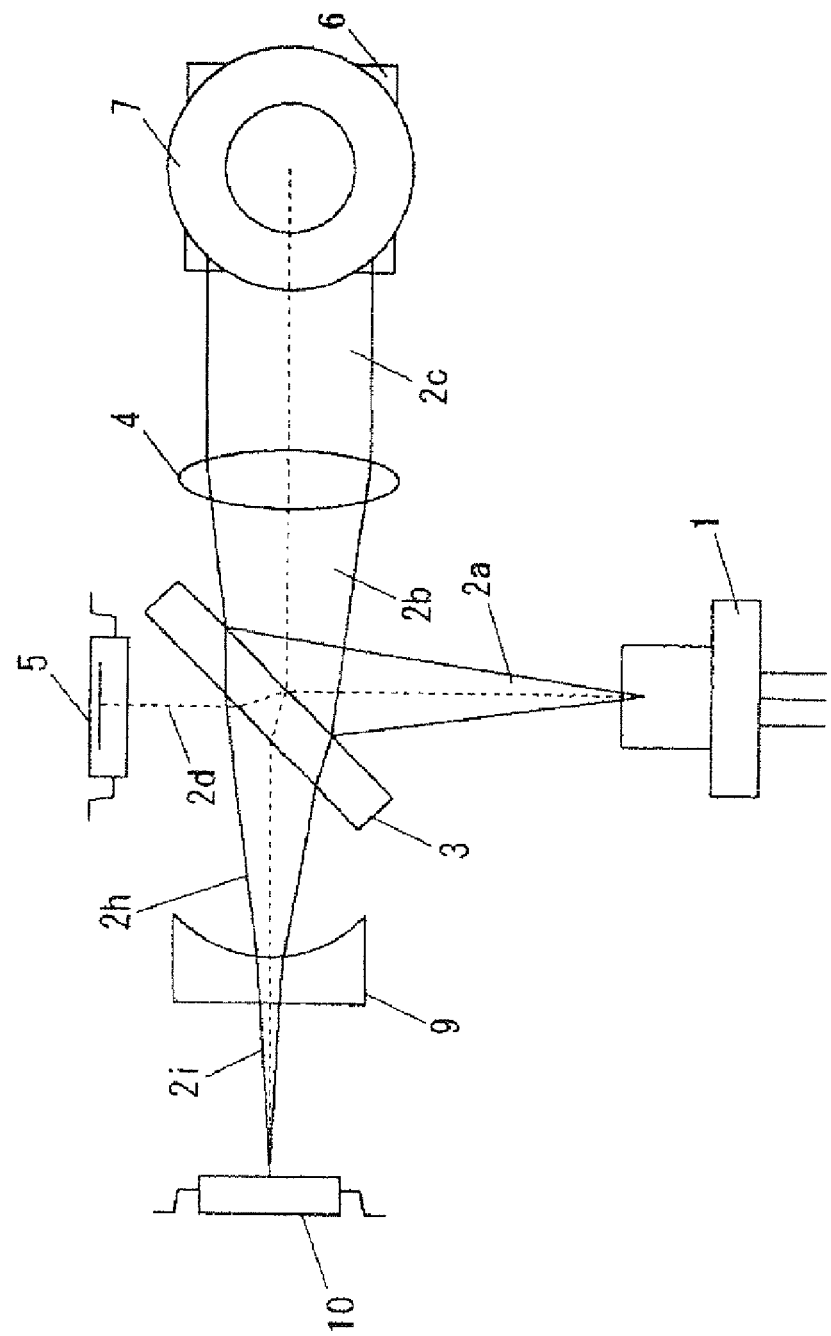
FIG. 1 is a diagram showing an optical pickup device according to the first embodiment of the invention.
Figure 2:
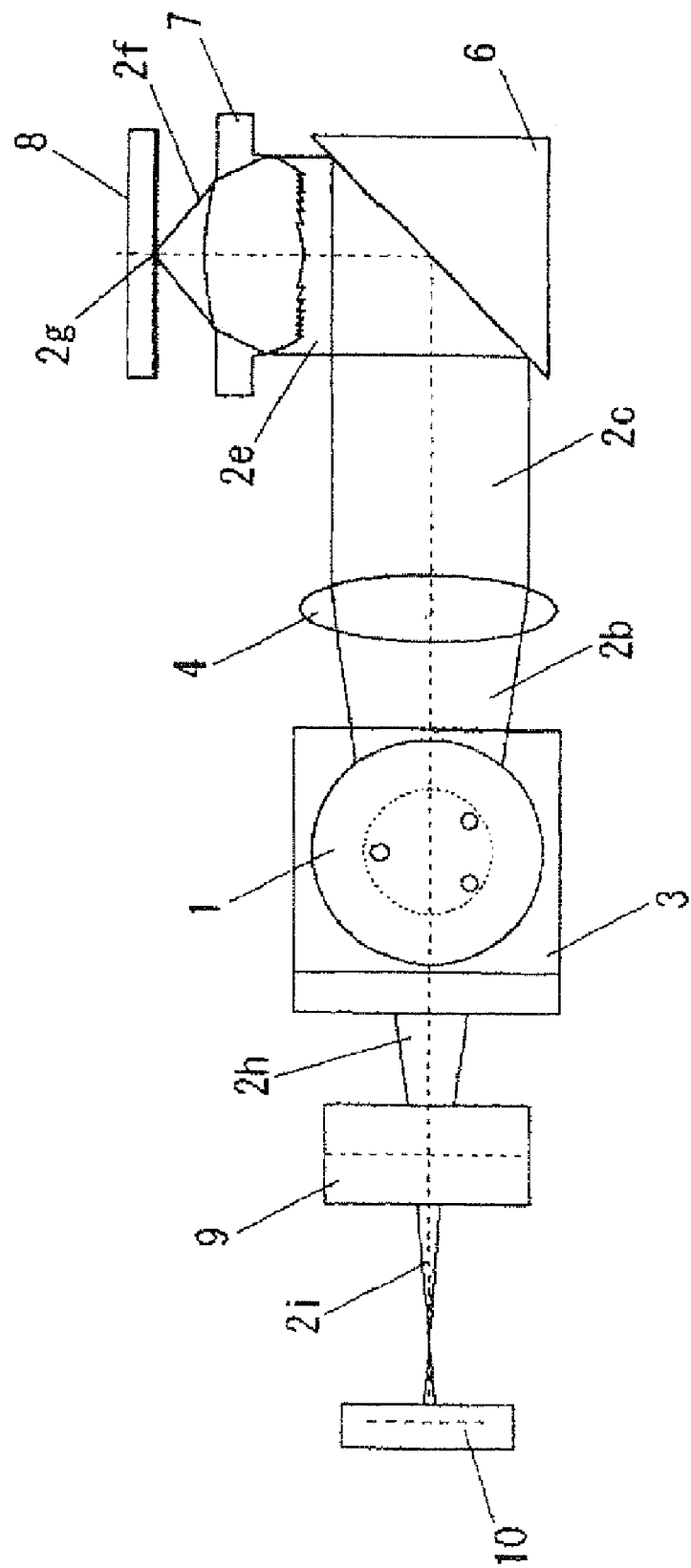
FIG. 2 is a diagram showing the optical pickup device according to the first embodiment of the invention.

FIG. 1 is a diagram showing the optical pickup device according to the first embodiment of the invention and is a diagram seen toward the optical axis direction of an objective lens from a recording medium side. FIG. 2 is a diagram showing the optical pickup device according to the first embodiment of the invention and is a diagram of the optical pickup device shown in FIG. 1 seen from the side direction thereof.

In FIGS. 1 and 2, a laser light ray $2a$ emitted from a semiconductor laser 1 is reflected by a flat plate beam splitter 3, then incident into a collimator lens 4 as a light ray $2b$ and formed into a parallel light ray $2c$ after passing through the collimator lens. A part $2d$ of the laser light $2a$ passes through the flat plate beam splitter 3 and is received by a laser emission light monitor sensor 5. The flat plate beam splitter 3 separates an incident light into a reflection light reflected thereby and a transmission light passing therethrough and is mostly designed so as to set a ratio between the refection light amount and the transmission light amount to 8:2, for example. The parallel light ray $2c$ is reflected by a rectangular mirror 6 and incident into an objective lens 7 as a parallel light ray $2e$. The parallel light ray $2e$ is formed into a converged light ray $2f$ by the objective lens 7 and irradiated on an optical disk 8 as a spot $2g$. Information is recorded on and reproduced from the optical disk 8 by means of the spot $2g$.

A reflection light ray of the spot $2g$ reflected by the optical disk 8 propagates in a direction opposite to that of the aforesaid optical path in a manner of $2f \rightarrow 2e \rightarrow 2c \rightarrow 2b$. Supposing that the flat plate beam splitter 3 is designed so as to have a ratio between the refection light amount and the transmission light amount to 8:2 as described above, for example, 20% of the entire reflection light ray from the optical disk 8 passes through the flat plate beam splitter 3 (a light ray $2h$ of FIGS. 1 and 2) and is incident into a cylindrical lens 9. The cylindrical lens 9 is a lens which acts as a concave lens as to a light ray propagating along the drawing sheet of FIG. 1 but does not act as a lens as to a light ray propagating along the drawing sheet of FIG. 2. Thus, the light ray $2h$ is converted into a light ray $2i$ having astigmatism. By using the light ray $2i$ having the astigmatism and a light receiving sensor 10, a focus error signal, a tracking error signal and an RF signal can be obtained as well known as the astigmatism method in the field of the optical head for an optical disk.

Figure 3:
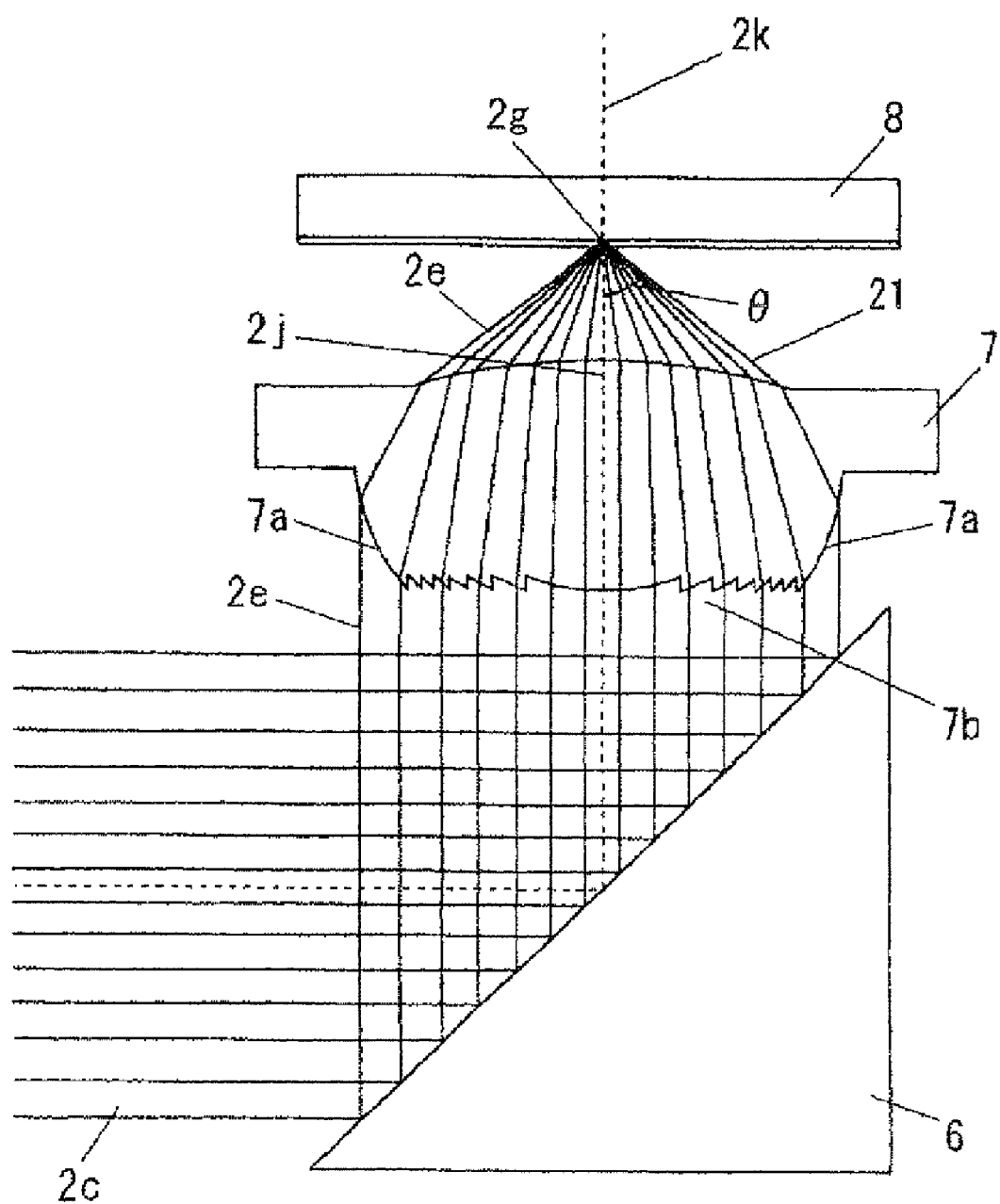
FIG. 3 is a diagram showing the relation among an objective lens, an optical disk and a rectangular mirror in the first embodiment of the invention.

FIG. 3 is a diagram showing the relation among the objective lens, the optical disk and the rectangular mirror in the first embodiment of the invention. This figure is an enlarged diagram near the rectangular mirror 6 and the objective lens 7 shown in FIG. 2 and shows a light ray which is incident into the objective lens 7 and focused as the spot $2g$ on the optical disk 8. A side surface of the objective lens 7 in which the laser light is incident is configured to form a refractive lens portion $7a$ at the outer periphery portion thereof and to form a Fresnel lens portion $7b$ at the inner periphery portion thereof. A light ray passing through the refractive lens portion $7a$ arrives at the spot $2g$ due to the refraction function thereof, whilst a light ray passing through the Fresnel lens portion $7b$ arrives at the spot $2g$ due to the diffraction function thereof. In this manner, both the light ray passing through the refractive lens portion $7a$ and the light ray passing through the Fresnel lens portion $7b$ can arrived at the same spot $2g$.

Supposing that, in the case where a laser light passing through the objective lens 7 is focused on the optical disk 8, an angle θ is formed between a first phantom line $2k$ coupling between the center potion 2j of the region of the objective lens 7 where the laser light passes and the spot 2g acting as the focal point and a second phantom line 2m coupling between the end portion 2l of the region of the objective lens 7 where the laser light passes and the spot 2g acting as the focal point, the numerical aperture becomes 0.85 due to the expression of numerical aperture=sin θ when the angle θ is about 58 degrees. Thus, this objective lens can be used as an objective lens compliant with a blue ray disk.

Figure 4:
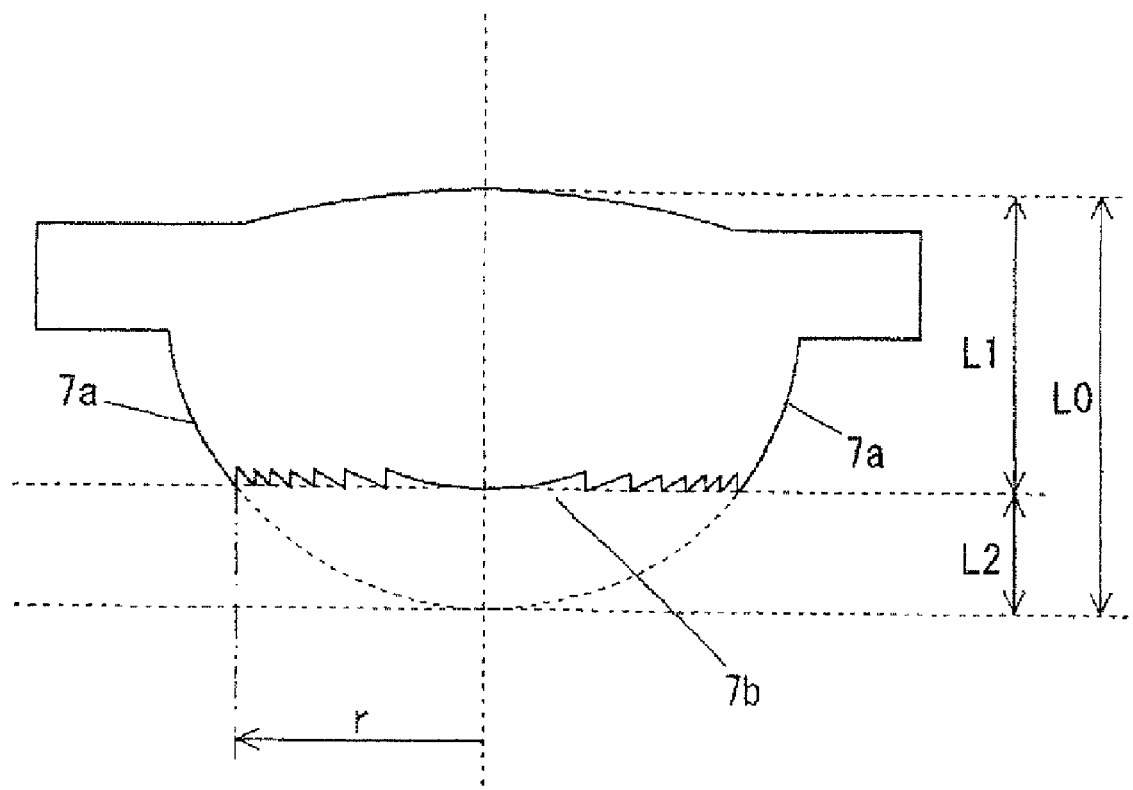
FIG. 4 is an enlarged diagram of the objective lens in the first embodiment of the invention.

FIG. 4 is an enlarged diagram of the objective lens in the first embodiment of the invention. In FIG. 4, supposing that the lens thickness of an objective lens is L0 when the objective lens is formed only by a lens having a refractive function, when the objective lens is formed in a manner that the center portion thereof with a thickness of L2 is formed by the Fresnel lens portion 7b having the diffraction function, the objective lens can be configured to have the entire thickness of L1 and so the thickness can be reduced to L0-L2.

In this manner, the side surface of the objective lens 7 in which the laser light is incident is configured to form the refractive lens at the outer periphery portion thereof and to form the Fresnel lens at the inner periphery portion thereof. Thus, only the inner periphery portion, which becomes most thick in the optical axis direction on the side surface of the objective lens 7 in which the laser light is incident, can be partially thinned, the maximum size of the objective lens in the optical axis direction can be made small.

Furthers when the aforesaid angle θ is about 58 degrees, since the objective lens according to the invention can be used as an objective lens compliant with a blue ray disk, the thinning of the optical pickup device and the optical disk drive apparatus for a blue ray disk can be easily realized.

Next, the explanation will be made as to a method of determining the boundary radius r between the refractive lens portion 7a and the Fresnel lens portion 7b.

Figure 5:
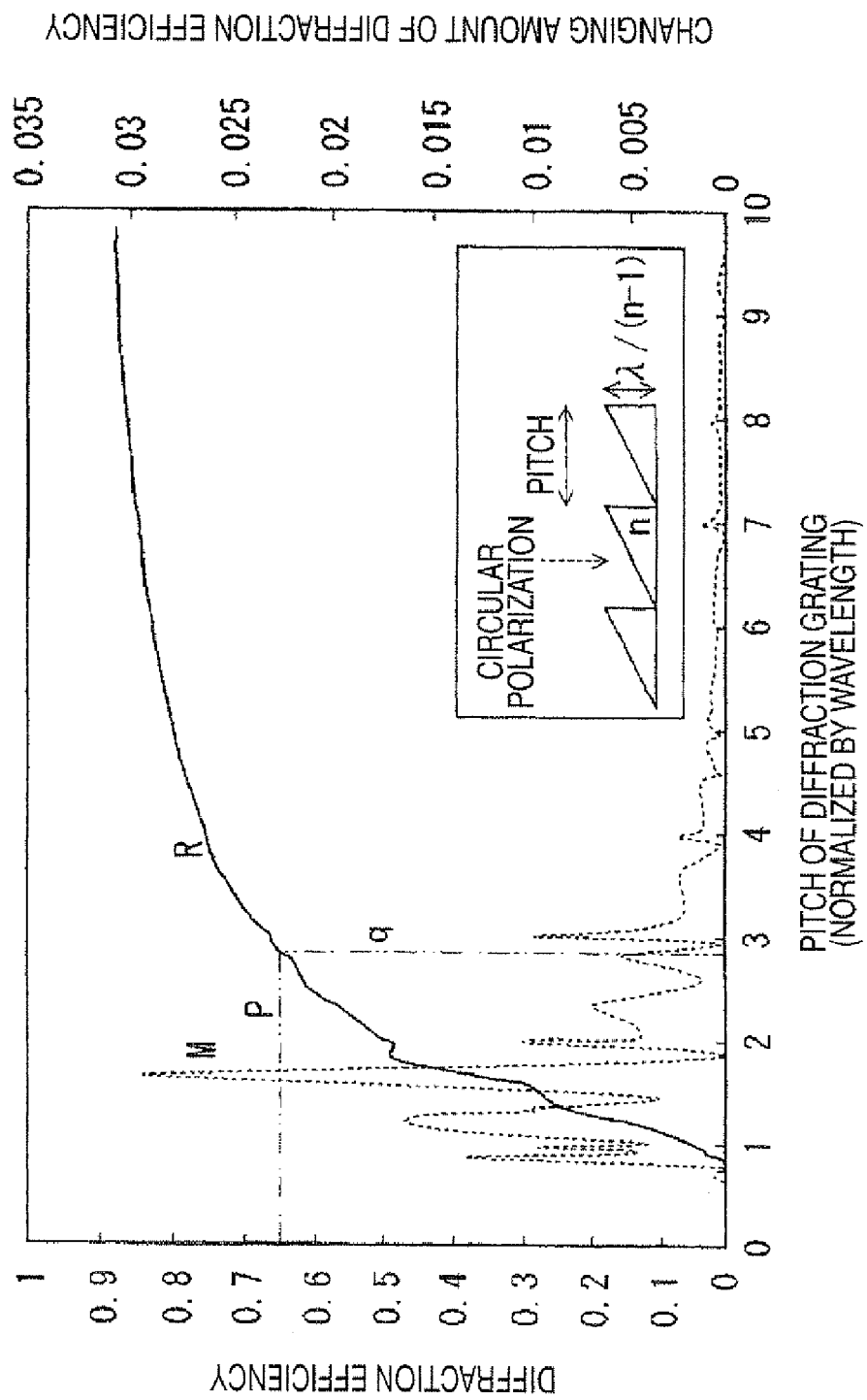
FIG. 5 is a diagram showing a relation between the pitch of the diffraction grating and the diffraction efficiency

FIG. 5 is a diagram showing a relation between the pitch of the diffraction grating and the diffraction efficiency based on the calculation values of the pitch of the diffraction grating and the diffraction efficiency. In the figure, the abscissa represents the pitch of the diffraction grating and the ordinate represents the diffraction efficiency. In the abscissa, the pitch of the diffraction grating is normalized by the wavelength of a light ray so as to generalize. The polarization state of the light ray is a circular polarization state which is general in the optical disk drive apparatuses. According to the standard of BD (compliant with a blue ray disk, hereinafter merely called a BD), with respect to the light intensity at the center portion of the objective lens with the numerical aperture NA of 0.85, the light intensity at the outer periphery portion of the lens is required to be 65% or more in the radius direction of the optical disk and 60% or more in the peripheral direction. Since the diffraction lens has rotational symmetries, it is required to satisfy the more strict numerical value of 65%.

In FIG. 5, when a cross point of a line p (a two-dot chain line) of the diffraction efficiency of 65% crossing with a diffraction efficiency curve R is moved down vertically toward the abscissa (pitch of the diffraction grating), the moved-down line q reaches about 3 as the pitch of the diffraction grating. Further, a curve M (broken line) representing the changing amount of the diffraction efficiency changes abruptly in a region where the pitch of the diffraction grating is smaller about 3. In a view point of both the absolute value of the efficiency and the changing amount of the efficiency, the boundary radius r is desirably to be a value where the pitch of the diffraction grating is larger than about 3 times as large as the wavelength of a light ray passing through the objective lens 7.

In the case of making the objective lens 7 shown in FIG. 4 be compliant with the BD standard, in order to set the numerical aperture NA of the objective lens 7 to 0.85 and the wavelength of the laser light being used to about 405 nm, the boundary between the outer periphery and the inner periphery is a position where the pitch of the Fresnel lens is three times as large as the wavelength 405 nm of the laser light, that is, 1,215 nm. Although the ideal value of the wavelength of the laser light being used is 405 nm, the wavelength varies in a range between 400 nm and 410 nm in fact. Thus, the boundary between the outer periphery and the inner periphery is preferably set to a position where the pitch of the Fresnel lens is in a range between 1,200 nm and 1,230 nm. Accordingly, such an objective lens can be used for an objective lens compliant with a blue ray disk in which the effective value of the wavelength of the laser light emitted from a light source is in a range between 400 nm and 410 nm.

In this manner, the boundary between the outer periphery and the inner periphery on the side surface of the objective lens 7 in which the laser light is incident is a position where the pitch of the Fresnel lens is about 1,215 nm in the case where the numeral aperture is 0.85. Thus, even if the objective lens is the objective lens 7 compliant with a blue ray disk, since the diffraction efficiency of the laser light passing through the objective lens 7 according to the invention is not degraded remarkably, the attenuation amount of the laser light passing through the objective lens 7 according to the invention can be made small. Accordingly, since it is not necessary to increase the light emission intensity of the light source in advance in view of the attenuation amount of the laser light passing through the objective lens 7 according to the invention, it is possible to prevent that the life time of the light source is shortened due to the increasing of the light emission intensity of the light source.

Further, the outer periphery of the side surface of the objective lens 7 in which the laser light is incident is formed by the refractive lens and the inner periphery thereof is formed by the Fresnel lens, and the boundary between the outer periphery and the inner periphery is a position where the pitch of the Fresnel lens is about 1,215 nm in the case where the numeral aperture is 0.85. Thus, in the case of configuring the side surface of the objective lens 7 in which the laser light is incident to form the Fresnel lens, since only the inner periphery in which it is possible to enlarge the pitch of the diffraction grating is configured to form the Fresnel lens but the outer periphery in which it is difficult to enlarge the pitch of the diffraction grating is configured to form the refractive lens, it is not necessary to provide the Fresnel lens at a region containing a portion where the pitch of the diffraction grating is minimum and so it is difficult to perform the process for the Fresnel lens. As a result, since it is not necessary to provide the Fresnel lens at the region containing the portion where the pitch of the diffraction grating is minimum, in the case of forming the Fresnel lens at the objective lens, it is not required to employ the high-grade fine processing technique or to spend a large processing time in order to minimize the pitch of the diffraction grating.

Next, the explanation will be made as to the manufacturing method of the objective lens according to the invention.

Figure 6:
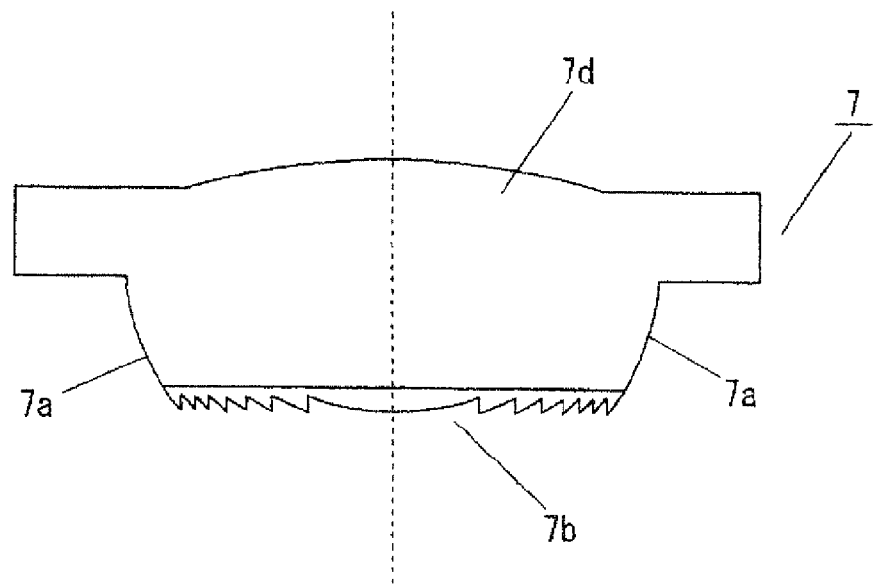
FIG. 6 is a diagram showing a method of manufacturing the Fresnel lens according to the first embodiment of the invention.
Figure 7:
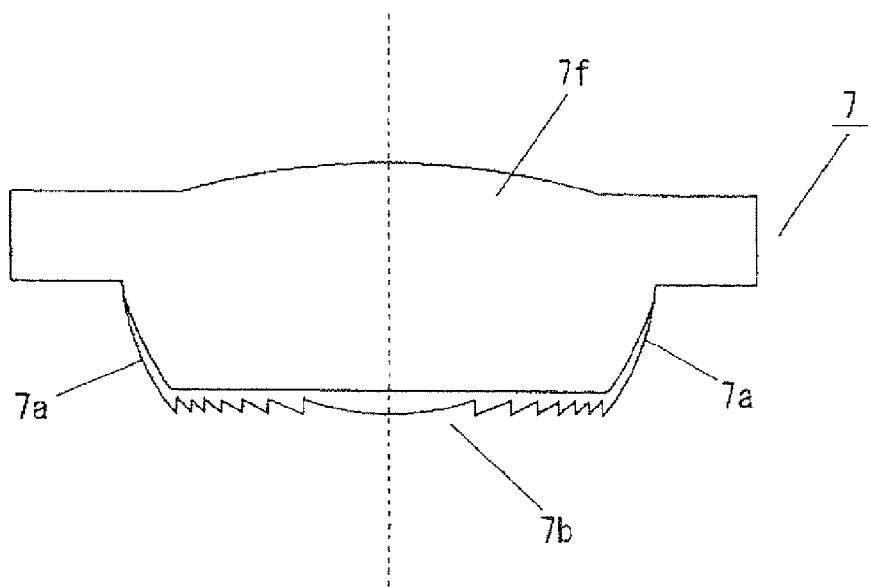
FIG. 7 is a diagram showing another method of manufacturing the Fresnel lens according to the first embodiment of the invention.
Figure 8:
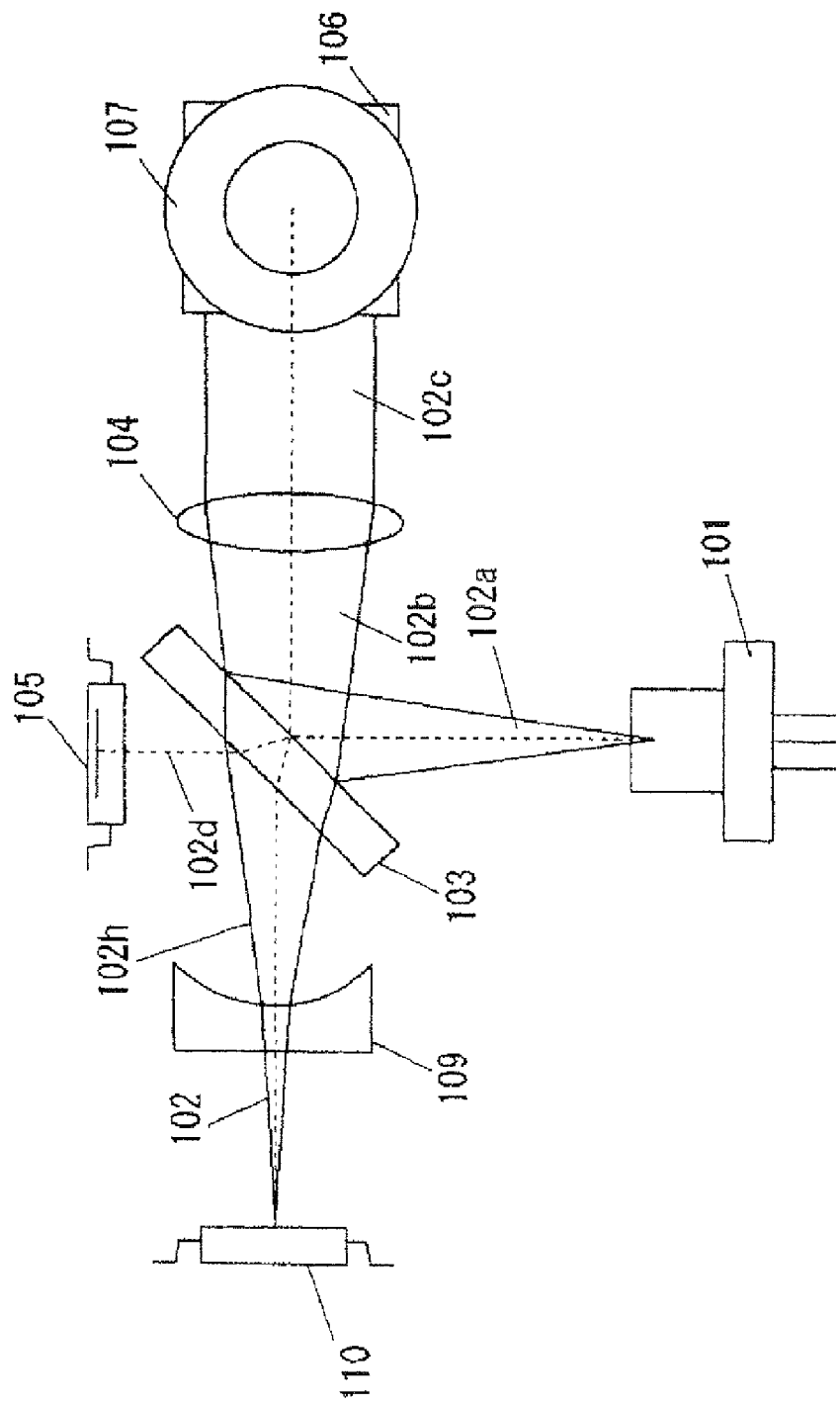
FIG. 8 is a diagram showing the optical configuration of an optical pickup device of a related art.
Figure 9:
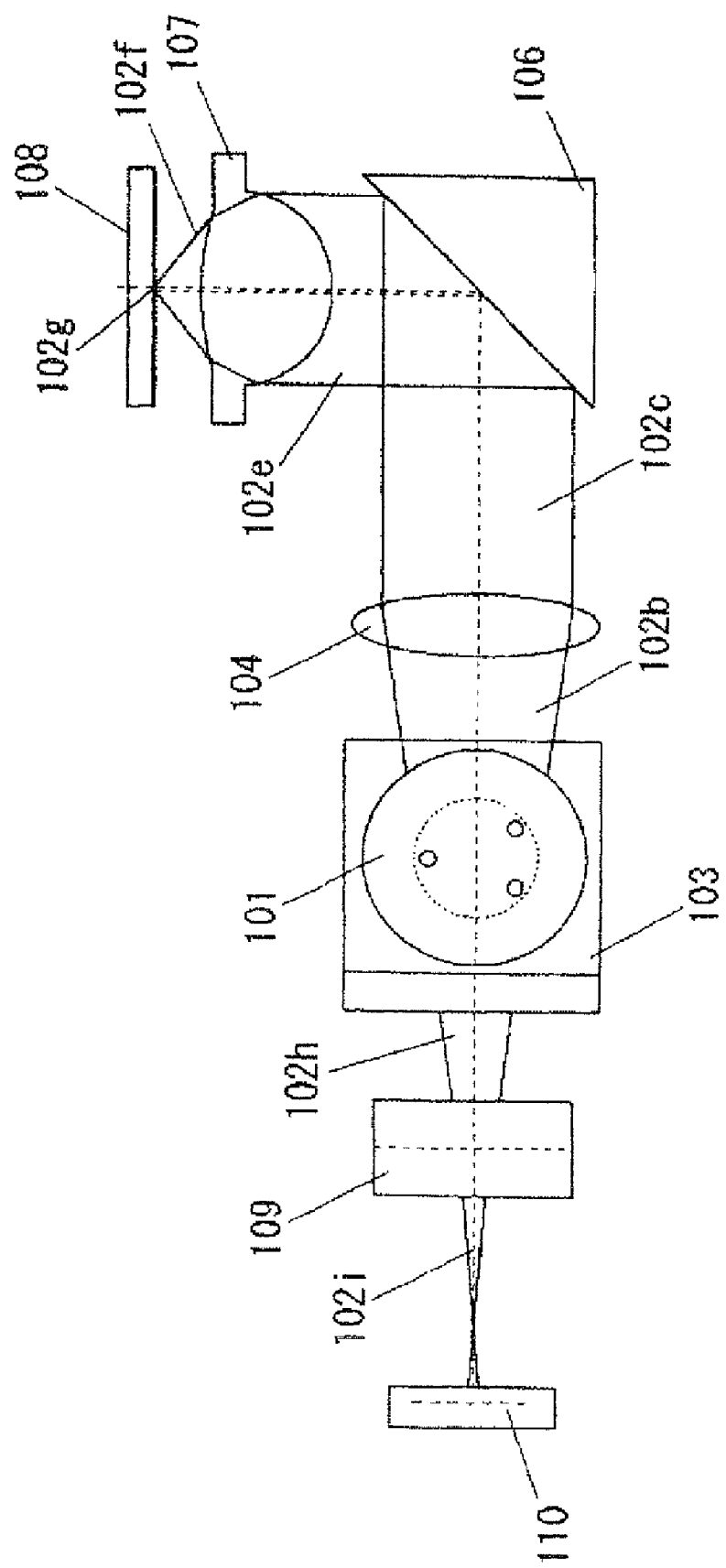
FIG. 9 is a diagram showing the optical configuration of the optical pickup device of the related art.
Figure 10:
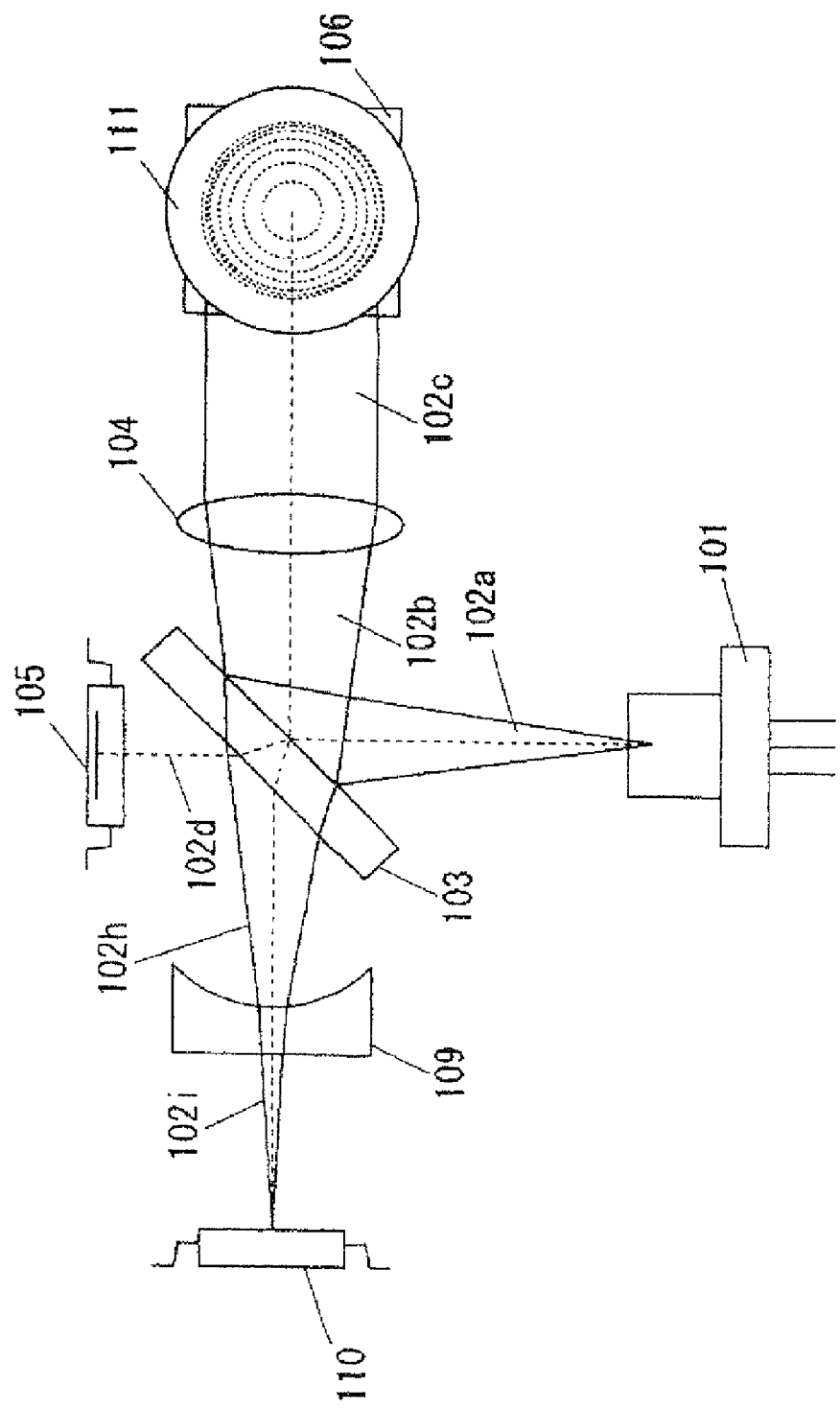
FIG. 10 is a diagram showing the optical configuration of the optical pickup device of the related art.
Figure 11:
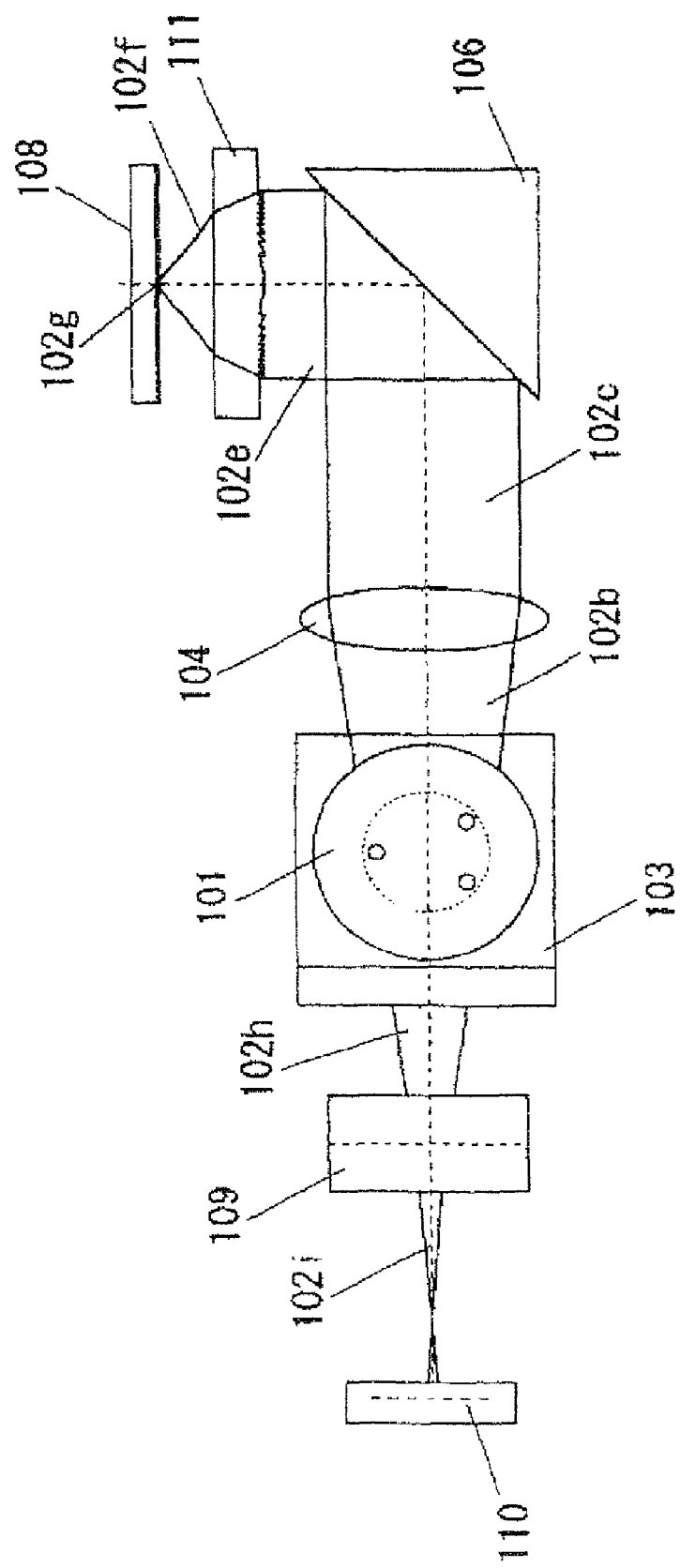
FIG. 11 is a diagram showing the optical configuration of the optical pickup device of the related art.
Figure 12:
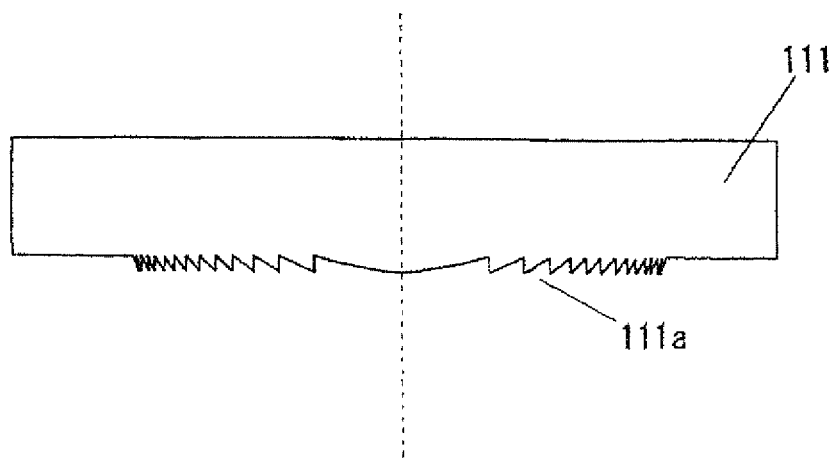
FIG. 12 is an enlarged diagram of a flat plate Fresnel lens of the optical pickup device of the related art.
Figure 13:
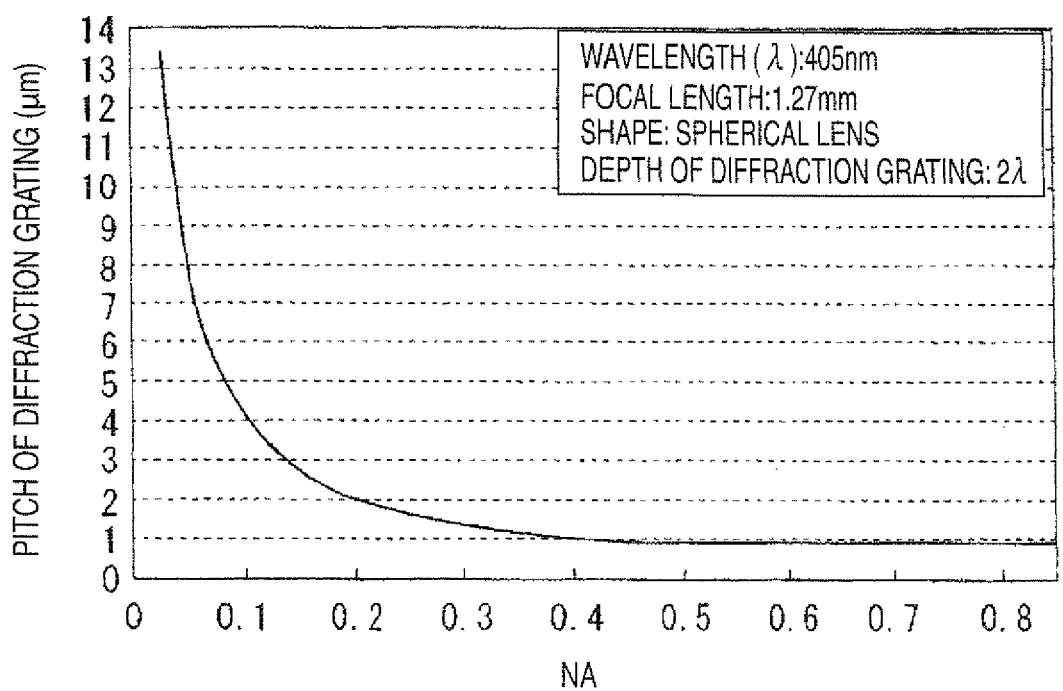
FIG. 13 is a diagram showing the relation between the numerical aperture and the pitch of the diffraction grating of the Fresnel lens.

FIGS. 6 and 7 are diagrams showing the method of manufacturing the Fresnel lens according to the first embodiment of the invention. In FIG. 6, the Fresnel lens portion is transferred on a base lens portion 7d where the refractive lens portion 7a is formed by means of a so-called 2P method using photo polymer etc. by using a mold at which the Fresnel lens portion 7b is formed, and the transferred Fresnel lens portion is subjected to the UV hardening to form the Fresnel lens portion. In FIG. 7, both the refractive lens portion 7a and the Fresnel lens portion 7b are simultaneously transferred and formed on a base lens portion 7f by using the 2P method similar to the manufacturing method shown in FIG. 6. According to the method of FIG. 6, it is important to secure the accuracy for accurately coinciding the lens center of the refractive lens portion 7a formed on the base lens portion 7d with the lens center of the Fresnel lens portion 7b formed by the 2P method. However, according to the method of FIG. 7, since both the refractive lens refractive lens portion 7a and the Fresnel lens Fresnel lens portion 7b are simultaneously transferred and formed with the same mold by using the 2P method, it is easy to secure the accuracy of the lens centers thereof, advantageously. The 2P method is an abbreviation of a Photo Polymer method, which is a technique of accurately transferring the shape of a mold.

Accordingly, since the outer periphery of the side surface of the objective lens in which the laser light is incident is formed by the refractive lens and the inner periphery thereof is formed by the Fresnel lens, the following two contradictory problems are solved. That is, the first problem is that when both the outer periphery and the inner periphery of the objective lens are entirely formed as the Fresnel lens in order to reduce the maximum size of the objective lens in the optical axis direction, the pitch of the diffraction grating at the outer periphery of the objective lens becomes too small and so it is difficult to manufacture the Fresnel lens or a high-grade fine processing technique is required in order to minimize the pitch of the diffraction grating. The second problem is that when the objective lens is not formed by the Fresnel lens at all, the maximum size of the objective lens in the optical axis direction can not be made small. Thus, according to the embodiment, the objective lens can be made thin to the maximum extent in a manufacturable range. As a result, since the maximum size of the objective lens in the optical axis direction can be made small to the maximum extent in a manufacturable range, the entire size of the apparatus mounting the objective lens can be made thin easily.

In this manner, the boundary between the outer periphery and the inner periphery on the side surface of the objective lens in which the laser light is incident is a position where the pitch of the Fresnel lens is about 1,215 nm in the case where the numeral aperture is 0.85. Thus, even if the objective lens is an objective lens compliant with a blue ray disk, since the diffraction efficiency of the laser light passing through the objective lens according to the invention is not degraded remarkably, the attenuation amount of the laser light passing through the objective lens according to the invention can be made small Accordingly, since it is not necessary to increase the light emission intensity of the light source in advance in view of the attenuation amount of the laser light passing through the objective lens according to the invention, it is possible to prevent that the life time of the light source is shortened due to the increasing of the light emission intensity of the light source.

Further, the outer periphery of the side surface of the objective lens in which the laser light is incident is formed by the refractive lens and the inner periphery thereof is formed by the Fresnel lens, and the boundary between the outer periphery and the inner periphery is a position where the pitch of the Fresnel lens is about 1,215 nm in the case where the numeral aperture is 0.85. Thus, in the case of configuring the side surface of the objective lens in which the laser light is incident to form the Fresnel lens, since only the inner periphery in which it is possible to enlarge the pitch of the diffraction grating is configured to form the Fresnel lens but the outer periphery in which it is difficult to enlarge the pitch of the diffraction grating is configured to form the refractive lens, it is not necessary to provide the Fresnel lens at a region containing a portion where the pitch of the diffraction grating is minimum and so it is difficult to perform the process for the Fresnel lens. As a result, since it is not necessary to provide the Fresnel lens at the region containing the portion where the pitch of the diffraction grating is minimum, in the case of forming the Fresnel lens at the objective lens, it is not required to employ the high-grade fine processing technique or to spend a large processing time in order to minimize the pitch of the diffraction grating.

Accordingly, both the objective lens and the apparatus for mounting the objective lens can be made thin, and it is possible to realize the objective lens and the optical pickup device each of which does not require the high-grade fine processing technique for minimizing the pitch of the diffraction grating at the manufacturing procedure.

In the first embodiment, the explanation is made exemplarily as to the objective lens which is mounted on an optical pickup device with respect to the configuration in which the outer periphery on the side surface of the objective lens in which the laser light is incident is formed by the refractive lens and the inner periphery thereof is formed by the Fresnel lens. However, the configuration of the invention is not limited thereto, and the invention may be applied to a lens for a projector or a lens for imaging photographs, for example.

This application is based upon and claims the benefit of priority of Japanese Patent Application No 2006-354287 filed on Dec. 28, 2006, the contents of which is incorporated herein by references in its entirety.

What is claimed is:

1. An objective lens which condenses a laser light emitted from a light source to irradiate on an optical disk,
wherein the objective lens has a side on which the laser light is incident, the side forming (a) a generally planar first surface portion which is approximately perpendicular to a direction of travel of the laser light and which is formed by a Fresnel lens and (b) a second surface portion which forms a refractive lens, the first surface being surrounded by the second surface portion.

2. The objective lens according to claim 1, wherein a boundary between the first surface portion and the second surface portion is a position where a pitch of the Fresnel lens is almost three times as large as a wavelength of the laser light.

3. The objective lens according to claim 1, wherein a boundary between the first surface portion and the second surface portion is a position where a pitch of the Fresnel lens is almost 1.215 nm when a numerical aperture of the objective lens is 0.85.

4. The objective lens according to claim 3, wherein the pitch of the Fresnel lens is almost 1.215 nm corresponds to a pitch of the Fresnel lens in a range between 1.200 nm and 1.230 am.

5. An optical pickup device comprising:
a light source which emits a laser light; and
the objective lens according to claim 2 which condenses the laser light to irradiate on an optical disk.

6. An optical pickup device comprising:
a light source which emits a laser light; and
the objective lens according to claim 3 which condenses the laser light to irradiate on an optical disk.

7. An optical pickup device comprising:
a light source which emits a laser light; and
the objective lens according to claim 4 which condenses the laser light to irradiate on an optical disk.

8. The optical pickup device according to claim 6, wherein in a case where the laser light passing through the objective lens is focused on the optical disk, with respect to an angle θ formed between a first phantom line coupling between a center potion of a region of the objective lens where the laser light passes and the focal point and a second phantom line coupling between an end portion of the region of the objective lens where the laser light passes and the focal point, a numerical aperture of the objective lens of 0.85 corresponds to sin θ equal to 0.85.

9. An optical disk drive apparatus comprising the optical pickup device according to claim 5.

10. An optical disk drive apparatus comprising the optical pickup device according to claim 6.

11. An optical disk drive apparatus comprising the optical pickup device according to claim 7.

12. An optical disk drive apparatus comprising the optical pickup device according to claim 8.

13. The objective lens according to claim 1, wherein the second surface portion is a generally hemispherical portion and the first surface portion includes a grating portion, tip portions of the grating portion and the hemispherical portion being positioned substantially within a common phantom plane.

* * * * *